US009367940B2

United States Patent
Weng et al.

(10) Patent No.: US 9,367,940 B2
(45) Date of Patent: Jun. 14, 2016

(54) METHOD FOR SINGLE-VIEW HAIR MODELING AND PORTRAIT EDITING

(71) Applicant: ZHEJIANG UNIVERSITY, Hangzhou (CN)

(72) Inventors: Yanlin Weng, Hangzhou (CN); Lvdi Wang, Hangzhou (CN); Menglei Chai, Hangzhou (CN); Kun Zhou, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 127 days.

(21) Appl. No.: 14/262,650

(22) Filed: Apr. 25, 2014

(65) Prior Publication Data

US 2014/0233849 A1    Aug. 21, 2014

Related U.S. Application Data

(63) Continuation of application No. PCT/CN2012/078202, filed on Jul. 5, 2012.

(30) Foreign Application Priority Data

Jun. 20, 2012  (CN) .......................... 2012 1 0207183

(51) Int. Cl.
*G06T 11/60*    (2006.01)
*G06T 11/00*    (2006.01)
(Continued)

(52) U.S. Cl.
CPC ............ *G06T 11/60* (2013.01); *G06K 9/00281* (2013.01); *G06T 7/0051* (2013.01);
(Continued)

(58) Field of Classification Search
CPC .................... G06T 17/00; G06T 13/40; G06T 2207/30201; G06T 15/205; G06T 2207/20112; G06T 2207/30196; G06T 7/0081; G06T 9/00281; G06T 9/00268
USPC ............................ 345/420; 382/154, 118, 190
See application file for complete search history.

(56) References Cited

U.S. PATENT DOCUMENTS 6,556,196 B1 *    4/2003    Blanz ................. G06K 9/00275
                                                                345/419
2009/0244083 A1 *   10/2009    Wei ....................... G06T 11/001
                                                                345/582

(Continued)

FOREIGN PATENT DOCUMENTS

CN    101344373 A    1/2009
CN    102063738 A    5/2011

(Continued)

OTHER PUBLICATIONS

Author: Bonneel et al. Title: Single Photo Estimation of Hair Appearance; Eurographics Symposium on Rendering 2009, vol. 28 (2009), No. 4, 1171-1180.*

(Continued)

*Primary Examiner* — Zhengxi Liu
*Assistant Examiner* — Yanna Wu
(74) *Attorney, Agent, or Firm* — J.C. Patents

(57) ABSTRACT

The invention discloses a method for single-view hair modeling and portrait editing. The method is capable of 3D structure reconstruction for individual's hairstyle in an input image, and it requires only a small amount of user inputs to bring about a variety of portrait editing functions; after steps of image preprocessing, 3D head model reconstruction, 2D strands extraction and 3D hairstyle reconstruction, the method finally achieves portrait editing functions such as portrait pop-ups, hairstyle replacements, hairstyle editing, etc.; the invention discloses a method for creating a 3D hair model from a single portrait view for the first time, thereby bringing about a series of practical portrait hairstyle editing functions, of which the effect is superior to methods in the prior art, and having features such as simple interactions and highly efficient calculations.

6 Claims, 3 Drawing Sheets

(51) Int. Cl.
  *G06T 7/00* (2006.01)
  *G06T 7/40* (2006.01)
  *G06K 9/00* (2006.01)
  *G06T 19/20* (2011.01)
  *G06T 17/00* (2006.01)

(52) U.S. Cl.
  CPC .............. *G06T7/0059* (2013.01); *G06T 7/0075* (2013.01); *G06T 7/0079* (2013.01); *G06T 7/0081* (2013.01); *G06T 7/0091* (2013.01); *G06T 7/402* (2013.01); *G06T 11/00* (2013.01); *G06T 17/00* (2013.01); *G06T 19/20* (2013.01); *G06T 2207/10004* (2013.01); *G06T 2207/10024* (2013.01); *G06T 2207/10028* (2013.01); *G06T 2207/20096* (2013.01); *G06T 2207/20112* (2013.01); *G06T 2207/30201* (2013.01); *G06T 2219/2021* (2013.01); *G06T 2219/2024* (2013.01)

(56) References Cited

U.S. PATENT DOCUMENTS

| | | | |
|---|---|---|---|
| 2010/0169055 A1 | 7/2010 | Kobeck et al. | 703/1 |
| 2012/0023456 A1* | 1/2012 | Sun | G06T 7/0081 715/863 |
| 2012/0075331 A1* | 3/2012 | Mallick | G06T 11/001 345/594 |
| 2012/0079378 A1 | 3/2012 | Goossens | 715/706 |

FOREIGN PATENT DOCUMENTS

| | | |
|---|---|---|
| CN | 102262788 A | 11/2011 |
| CN | 102339475 A | 2/2012 |
| CN | 102368300 A | 3/2012 |
| CN | 102419868 A | 4/2012 |
| EP | 1 505 546 A2 | 2/2005 |
| JP | H11-328444 | 11/1999 |
| JP | 2001-216531 A | 8/2001 |
| KR | 2001-0084996 | 9/2001 |
| WO | WO 2010/024486 A1 | 3/2010 |

OTHER PUBLICATIONS

Author: Bonneel et al. Title: Single Photo Estimation of Hair Appearance; Eurographics Symposium on Rendering 2009 Hendrik P. A. Lensch and Peter-Pike Sloan, vol. 28 (2009), No. 4, p. 1171-1180.*
Tommer Leyvand et al., "Data-Driven Enhancement of Facial Attractiveness" ACM Transactions on Graphics (TOG)—Proceedings of ACM SIGGRAPH 2008, vol. 27 Issue 3, Aug. 2008, Article No. 38.
Dmitri Bitouk et al., "Face Swapping: Automatically Replacing Faces in Photographs" ACM Transactions on Graphics (TOG)—Proceedings of ACM SIGGRAPH 2008, vol. 27 Issue 3, Aug. 2008, Article No. 39.
Neel Joshi et al., "Personal Photo Enhancement Using Example Images" ACM Transactions on Graphics (TOG)—Proceedings of ACM SIGGRAPH 2010, vol. 29 Issue 2, Mar. 2010, Article No. 12.
Shizhe Zhou et al., "Parametric Reshaping of Human Bodies in Images" ACM Transactions on Graphics (TOG)—Proceedings of ACM SIGGRAPH 2010, vol. 29 Issue 4, Jul. 2010, Article No. 126.
Kevin Dale et al., "Video Face Replacement" ACM Transactions on Graphics (TOG)—Proceedings of ACM SIGGRAPH Asia 2011, vol. 30 Issue 6, Dec. 2011, Article No. 130.
Fei Yang et al., "Expression Flow for 3D-Aware Face Component Transfer" ACM Transactions on Graphics (TOG)—Proceedings of ACM SIGGRAPH 2011, vol. 30 Issue 4, Jul. 2011, Article No. 60.
Ira Kemelmacher-Shizerman et al., "Exploring Photobios" ACM Transactions on Graphics (TOG)—Proceedings of ACM SIGGRAPH 2011, vol. 30 Issue 4, Jul. 2011, Article No. 61.
Kelly Ward et al., "A Survey on Hair Modeling: Styling, Stimulation, and Rendering" IEEE Transactions on Visualization and Computer Graphics, vol. 13 Issue 2, Mar. 2007, pp. 213-234.
Sylvain Paris et al., "Capture of Hair Geometry from Multiple Images" ACM Transactions on Graphics (TOG)—Proceedings of ACM SIGGRAPH 2004, vol. 23 Issue 3, Aug. 2004, pp. 712-719.
Yichen Wei et al., "Modeling Hair from Multiple Views" ACM Transactions on Graphics (TOG)—Proceedings of ACM SIGGRAPH 2005, vol. 24 Issue 3, Jul. 2005, pp. 816-820.
Sylvain Paris et al., "Hair Photobooth: Geometric and Photometric Acquisition of Real Hairstyles" ACM Transactions on Graphics (TOG)—Proceedings of ACM SIGGRAPH 2008, vol. 27 Issue 3, Aug. 2008, Article No. 30.
Wenzel Jakob et al., "Capturing Hair Assemblies Fiber by Fiber" ACM Transactions on Graphics (TOG)—Proceedings of ACM SIGGRAPH Asia 2009, vol. 28 Issue 5, Dec. 2009, Article No. 164.
Derek Hoiem et al., "Automatic Photo Pop-up" ACM Transactions on Graphics (TOG)—Proceedings of ACM SIGGRAPH 2005, vol. 24 Issue 3, Jul. 2005, pp. 577-584.
Alec Rivers et al., "2.5D Cartoon Models" ACM Transactions on Graphics (TOG)—Proceedings of ACM SIGGRAPH 2010, vol. 29 Issue 4, Jul. 2010, Article No. 59.
A. C. Oztireli et al., "3D Modeling with a Symmetric Sketch" Eurographics Symposium on Sketch-Based Interfaces and Modeling, 2011, pp. 23-30.
Yin Li et al., "Lazy Snapping" ACM Transactions on Graphics (TOG)—Proceedings of ACM SIGGRAPH 2004, vol. 23 Issue 3, Aug. 2004, pp. 303-308.
Anat Levin et al., "A Closed Form Solution to Natural Image Matting" IEEE Transactions on Pattern Analysis and Machine Intelligence, vol. 30 Issue 2, Feb. 2008, pp. 228-242.
Connelly Barnes et al., "PatchMatch: A Randomized Correspondence Algorithm for Structural Image Editing" ACM Transactions on Graphics (TOG)—Proceedings of ACM SIGGRAPH 2009, vol. 28 Issue 3, Aug. 2009, Article No. 24.
Stephen Milborrow et al., "Locating Facial Features with an Extended Active Shape Model" ECCV '08 Proceedings of the 10th European Conference on Computer Vision: Part IV, pp. 504-513, 2008.
Stephen R. Marschner et al., "Light Scattering from Human Hair Fibers" ACM Transactions on Graphics (TOG)—Proceedings of ACM SIGGRAPH 2003, vol. 22 Issue 3, Jul. 2003, pp. 780-791.
International Search Report of corresponding international PCT Application No. PCT/CN2012/078202, dated Mar. 28, 2013.
Fu, Jie et al., "Study of 3D Hair Modeling Methods" Computer Simulation , Issue 11, No. 23, pp. 86-90 , 2006 (Abstract).
Hong, Zhi-Feng et al., "Complex 3D Modeling Hair Method Research and Simulation" Computer Simulation, Issue 9, No. 28, pp. 287-290 , 2011 (Abstract).
Chinese First Examination Report of corresponding China Application No. 201210207183.5, dated Jun. 5, 2014.

* cited by examiner

METHOD FOR SINGLE-VIEW HAIR MODELING AND PORTRAIT EDITING

CROSS-REFERENCE TO RELATED APPLICATIONS

This application is a continuation of International Application No. PCT/CN2012/078202, filed on Jul. 5, 2012, which claims the priority benefit of Chinese Patent Application No. 201210207183.5, filed on Jun. 20, 2012, both of which are hereby incorporated by reference in their entireties.

TECHNICAL FIELD

The present invention relates to the field of image processing and, in particular, to a method for single-view hair modeling and portrait editing.

BACKGROUND

The background pertaining to the present invention is as follows:

I. Portrait Editing

Because a human portrait is a major component of photographs, as well as one of the image types of the greatest interest, portrait editing is of substantial application merits.

While there exist some portrait editing methods directly working in the two-dimensional (2D) image space such as face beautification (Leyvand, T., Cohen-Or, D., Dror, G., and Lischinski, D. 2008. Data-driven enhancement of facial attractiveness. ACM Trans. Graph. 27, 3, 38:1-38:9.), face swapping without giving source (Bitouk, D., Kumar, N., Dhillon, S., Belhumeur, P. N., and Nayar, S. K. 2008. Face Swapping: Automatically replacing faces in photographs. ACM Trans. Graph. 27, 39:1-39:8.), face enhancement (Joshi, N., Matusik, W., Adelson, E. H., and Kriegman, D. J. 2010. Personal photo enhancement using example images. ACM Trans. Graph. 29, 3, 12:1-12:15.), there is a trend recently in mapping 2D images to three-dimensional (3D) models for more complex applications, such as reshaping of human bodies (Zhou, S., Fu, H., Liu, L., Cohen-Or, D., and Han, X. 2010. Parametric reshaping of human bodies in images. ACM Trans. Graph. 29, 4, 126:1-126:10.), face swapping with source given (Dale, K., Sunkavalli, K., Johnson, M. K., Vlasic, D., Matusik, W., and Pfister, H. 2011. Video face replacement. ACM Trans. Graph. 30, 6, 130:1-130:10.), face component transfer (Yang, F., Wang, J., Shechtman, E., Bourdev, L., and Metaxas, D. 2011. Expression flow for 3D-aware face component transfer. ACM Trans. Graph. 30, 4, 60:1-60: 10.), and face animations from large image collections (Shlizerman, I. K., Shechtman, E., Garg, R., and Seitz, S. M. 2011. Exploring photobios. ACM Trans. Graph. 30, 4, 61:1-61:9.), etc.

The specialized 3D model information may enable the portrait editing process to understand fundamentally intricate semantic information contained in an image, and better resolve numerous practical problems caused by ambiguities and occlusions in the destination image.

In view of these researches, the present invention has brought about many new portrait hairstyle editing functions by creating a strand-based 3D hair model for a person's portrait hairstyle.

II. Hair Modeling

Hair modeling is an extensively studied problem in computer graphics, see document below for a comprehensive survey (Ward, K., Bertails, F., Kim, T.-Y., Marschner, S. R., Cani, M.-P., and Lin, M. C. 2007. A survey on hair modeling: styling, simulation, and rendering. IEEE Transactions on Visualization and Computer Graphics 13, 2, 213-234.). The method according to the present invention is most related to image-based hair capture methods thereof, including "Paris, S., Briceno, H., and Sillion, F. 2004. Capture of hair geometry from multiple images. ACM Trans. Graph. 23, 3, 712-719.", "Wei, Y., Ofek, E., Quan, L., and Shum, H.-Y. 2005. Modeling hair from multiple views. ACM Trans. Graph. 24, 3, 816-820.", "Paris, S., Chang, W., Kozhushnyan, O. I., Jarosz, W., Matusik, W., Zwicker, M., and Durand, F. 2008. Hair photobooth: geometric and photometric acquisition of real hairstyles. ACM Trans. Graph. 27, 3, 30:1-30:9.", and "Jakob, W., Moon, J. T., and Marschner, S. 2009. Capturing hair assemblies fiber by fiber. ACM Trans. Graph. 28, 5, 164:1-164:9". These methods can reconstruct a full 3D model by utilizing multiple hair images taken from different viewpoints, after which the hair model can be rendered in computer graphic applications. Nevertheless, in an application scene of the method according to the present invention, the input is a single image without any knowledge about the hair 3D geometry or the lighting of the scene. Therefore, the method of the present invention aims at generating a plausible high-resolution strand-based hair model for portrait editing applications.

III. Single-View 3D Modeling

Single-view modeling is in general an ill-posed problem. Focusing on specific objects or scenes (Hoiem, D., Efros, A. A., and Hebert, M. 2005. Automatic photo pop-up. ACM Trans. Graph. 24, 3, 577-584.), a method of pop-up (pop-up) for outdoor photos containing ground, sky, and walls is proposed; "Rivers, A., Igarashi, T., and Durand, F. 2010. 2.5D cartoon models. ACM Trans. Graph. 29, 4, 59:1-59:7." proposes a 2.5D modeling method for cartoon images which conducts smooth interpolation on a small number of cartoon images taken from different views to make it appears like a 3D object; "Oztireli, A. C., Uyumaz, U., Popa, T., Sheffer, A., and Gross, M. 2011. 3D modeling with a symmetric sketch. In Proceedings of SBIM, 23-30." proposes a method that extracts a 2.5D model of a bilateral symmetric object from a simple user sketch.

SUMMARY

The present invention aims at providing a method for single-view hair modeling and portrait editing with respect to the inadequacy of the prior art. By reconstructing 3D hairstyle models in the portrait image, the method can achieve numerous interactive portrait editing functions which are hard to achieve by existing image editing methods, being of highly practical merits.

The goal of the present invention is accomplished by the following technical solutions: a method for single-view hair modeling and portrait editing, which includes steps as follows:

(1) image preprocessing: segmenting an image into four layers based upon sparse user strokes by adopting a Lazy-Snapping image segmentation method: human hair, human face, human body and background, calculating opacity values in the segmented human hair region by an alpha-matting method for better human hair segmentation, setting apart the foreground color of the segmented human hair region from its background color, and completing occluded portions in the human body region and the background region;

(2) 3D head model reconstruction: automatically locating facial feature points by an ASM method, estimating head transformation parameters and fitting a 3D head model by least squares optimization based on the feature points and a 3D head model database after PCA dimension reduction, and carrying out inverse texture mapping in accordance with the segmented human face region obtained by step (1), so as to obtain a texture image of the head model;

(3) 2D strands extraction: computing a 2D orientation field and its corresponding confidence map by using a Gabor kernel function within the hair region obtained in step (1), and obtaining a set of sparse 2D strand curves by tracing based on the 2D orientation field and the confidence map;

(4) 3D hairstyle reconstruction: carrying out energy optimization in conjunction with the fitted head model according to step (2), coherence among nearby strands and occlusion correlations among strands, solving and obtaining depth information of all 2D strands generated from step (3), volumizing according to the 3D strands so as to obtain an adequately dense 3D strand set around the head as a recovered hairstyle model, and sampling all strand vertices from an original image to obtain hair color values;

(5) synthesis and application: carrying out portrait editing applications as portrait pop-ups, hairstyle replacements and hairstyle editing by adopting reconstructed 3D information such as the human hairstyle model, the human head model and so on according to the aforementioned steps (1)-(4).

The beneficial effects of the present invention are: the invention guides the portrait editing process by reconstructing a 3D model for a portrait, effectively avoiding the effect of image ambiguities and occlusion; the invention proposes a 3D modeling method for a single-view intricate portrait hairstyle for the first time, which conveniently estimates credible 3D information of a hairstyle and synthesizes a structure for nonhair regions by creating a strand-based 3D hair model, thus being applied to numerous portrait editing applications by coupling with other single-view 3D modeling methods, and enabling related editing effects to conform to actual conditions. In contrast to similar existing portrait editing methods, the invention has more robust adaptability towards various hairstyle types, face orientations, body postures, and backgrounds from a portrait input.

DESCRIPTION OF EMBODIMENTS

The core technology of the invention is to conduct 3D reconstruction on hairstyle in a single-view portrait, and to apply it in various portrait editing applications such as hair modeling, portrait editing, etc. The method is mainly composed of five major steps as follows: image preprocessing, 3D head model reconstruction, 2D strands extraction, 3D hairstyle reconstruction, and synthesis and application.

Figure 1:
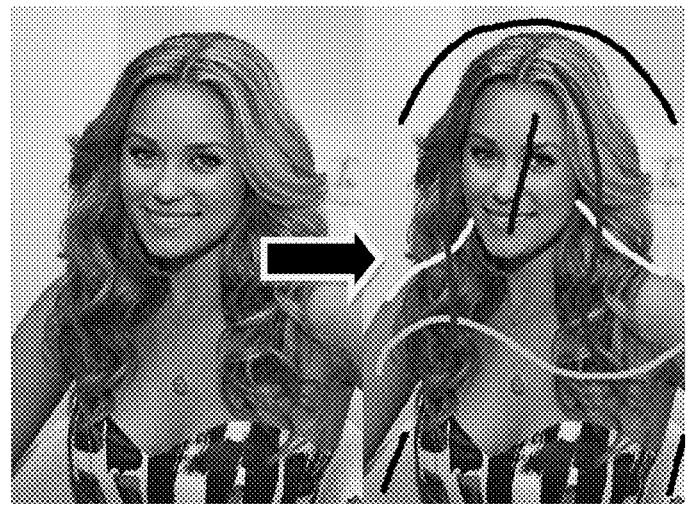
FIG. 1 is a diagram of segmenting an image through user interaction according to the present invention.

I. image preprocessing: segment an image into four layers based upon sparse user strokes by adopting a Lazy-Snapping image segmentation method: human hair, human face (not occluded by hair), human body and background, calculate opacity values in a segmented human hair region by an alpha-matting method for better human hair segmentation, set apart the foreground color of the segmented human hair region from its background color, and complete occluded portions in the human body region and the background region; as shown in FIG. 1, this step is achieved by the following 3 sub-steps:

1.1 User-Assisted Image Segmentation

Due to the complexities of contents and shapes around its boundary of each layer in the image, there is no way to automatically segment these regions. Therefore, this method segments visible regions of each layer by adopting the Lazy-Snapping technique (Li, Y., Sun, J., Tang, C., and Shum, H. 2004. Lazy snapping. ACM Trans. Graph. 23, 3, 303-308.) where a user assists in indicating a few strokes, and obtains four layers $R_{hair}$, $R_{face}$, $R_{body}$ and $R_{background}$.

1.2 Matting of the Hair Region

Since hair is generally translucent and the hair region in an image often has a complicated boundary, the segmented hair region obtained from step 1.1 is approximately correct but not sufficiently accurate for the demand of this method. This method automatically improves a hair segmentation result with the following matting manipulations:

1) erode and dilate the hair region $R_{hair}$ obtained from the image segmentation step assisted by the user to certain widths (the eroding and dilating widths of this method are both a width size of ten pixels, and obtain two new hair regions, $R_{hair}^{erosion}$ and $R_{hair}^{dilation}$;

2) treat the hair regions $R_{hair}$, $R_{hair}^{erosion}$ and $R_{hair}^{dilation}$ obtained from step (1) as a group of trimap, i.e., let the hair opacity of an outer region of the dilated $R_{hair}^{dilation}$ be zero, let the hair opacity of an inner region of the eroded $R_{hair}^{erosion}$ be one, and solve the hair opacity of a region inside $R_{hair}^{dilation}$ and outside $R_{hair}^{erosion}$, i.e., the hair boundary region, by the matting method (within the range of (0, 1)). This method adopts a closed-form matting method (Levin, A., Lischinski, D., and Weiss, Y. 2008. A closed-form solution to natural image matting. IEEE Transactions on Pattern Analysis and Machine Intelligence 30, 2, 228-242.) to solve and obtain hair opacity values $A_{hair}$ in the entire image, a foreground color $C_{hair}^{foreground}$ (i.e., the hair color without other regions' colors in the image) and a background color $C_{hair}^{background}$ (i.e., other regions' colors in the image excluding the hair color) in the hair boundary region, which satisfies:

$$A_{hair}C_{hair}^{foreground} + (1-A_{hair})C_{hair}^{background} = C_{image};$$

3) treat a hair region with opacities obtained from step 2) as an improved hair segmentation result, and within the hair boundary region (the region inside $R_{hair}^{dilation}$ and outside $R_{hair}^{erosion}$), treat the foreground color $C_{hair}^{foreground}$ as a hair region color and treat the background color $C_{hair}^{background}$ as a hair background region (i.e., other layers overlaying the hair at current location) color.

1.3 Completing Body and Background Regions

Usually, a human body and background will be occluded by the human body, the human hair, etc., when the user manipulates the portrait with interaction, such as rotating the view or changing the hairstyle, the occluded portions may become visible. In order to resolve the problem, this method fills the occluded portions of these two layers by adopting the PatchMatch method (Barnes, C., Shechtman, E., Finkelstein, A., and Goldman, D. B. 2009. PatchMatch: A randomized correspondence algorithm for structural image editing. ACM Trans. Graph. 28, 3, 24:1-24:11.). With respect to the body region, the user needs to interactively indicate a body boundary on the occluded locations.

II. 3D head model reconstruction: automatically locate facial feature points by the ASM (Active Shape Model) method, optimally estimate head transformation parameters and fitting a 3D model by least squares optimization based on the feature points and a 3D head model database after PCA (Principle Component Analysis) dimension reduction, and carry out inverse texture mapping in accordance with the segmented human face region obtained by step I, so as to obtain a texture image of a head model;

2.1 Localization of Image Facial Feature Points

Firstly, carry out the face recognition by adopting the Viola-Jones recognition algorithm, and approximately estimate the size of the human face region.

Automatically localize facial feature points of the human face region in the image, the process of which adopts the Active Shape Model (ASM) method (Milborrow, S., and Nicolls, F. 2008. Locating facial features with an extended active shape model. In Proceedings of ECCV'08, Springer, 504-513.) to localize 73 facial feature points ($n_f$=73), including 15 face silhouette feature points, 12 brow feature points (6 each for left and right), 16 eye feature points (8 each for left and right), 12 nose feature points and 18 mouth feature points (12 and 6 for internal silhouette and external silhouette respectively).

2.2 Head Model Fitting

Utilize the open Basel Face Model database as a head model database, where the coherence of all models thereof on topology structures (same vertex size, indices and connection relationships), and the model scales are normalized. Concatenate all vertices' 3D coordinates of each head model in the database into one vector, $S=[P_x^1, P_y^1, P_z^1, \ldots, P_x^v, P_y^v, P_z^v]$, as one training data sample. Carry out a PCA analysis for all data, and obtain an average data vector $\bar{S}$, the first $n_p$ pivot vectors and corresponding feature values $\lambda$ (the result of this method let the pivot number $n_p$ be 100). Given any coefficient vector $\beta$ of the pivot vector, a corresponding head model data vector can be generated:

$$S^* = \bar{S} + V \cdot \beta;$$

Assume the portrait is in a weak perspective projection model, with respect to a projection matrix R, the manipulation of projecting a 3D point $P_{3D}$ onto a 2D image plane is $P_{2D}=R \cdot P_{3D}$; during the process of head model fitting, define an energy equation E including a feature point error $E_{error}$ and a parameter penalty $E_{coef}$ as follows:

$$E = w_{error} E_{error} + w_{coef} E_{coef},$$

$$E_{error} = \sum_{k=0}^{n_f} w_k \| R \cdot (\bar{S}_{(k)} + V_{(k)} \cdot \beta) - X_k \|^2,$$

$$E_{coef} = \sum_{k=0}^{n_p} \left( \frac{\beta_k}{\lambda_k} \right)^2;$$

Where $w_k$ is a weight of a corresponding feature point, $X_k$ is the localized position of the feature point, and $\bar{S}_{(k)}$ and $V_{(k)}$ are corresponding values of the feature point in the head model on an average model and on a feature vector respectively; with respect to a non-silhouette feature point, statically select a certain vertex in the head model as its corresponding point, i.e.:

$$V_{(k)} = V_{index(k)};$$

However, with respect to the face outline, dynamically select a vertex in the current head model which is closest to the feature point as a corresponding model position of the feature point.

Optimize the energy term by the method of least squares, obtain a feature vector coefficient $\beta$ when $\nabla_\beta E=0$, and obtain its corresponding head model, which is the fitted result $S_{fit}$.

During the fitting process, according to the current fitted result $S_{fit}$, this method iteratively estimates a projection matrix R by least squares optimization, and fits a head model $S_{fit}$ under the current projection matrix R. The iteration process in general will converge after 4-5 times.

2.3 Model Texture Reconstruction

By adopting a texture parametric UV coordinate of the head model, anti-aliasing texture map the segmented human face region $R_{face}$ in step I onto the fitted head model $S_{fit}$ in step 2.2, and generate a texture image $I_{fit}$ of the visible part. Carry out the filling manipulation for the invisible part (i.e. a region that has not been anti-aliasing texture mapped) on $I_{fit}$. Referring to a standard human face texture image $I_{ref}$ in the Basel Face Model database, solve all invisible pixels on $I_{fit}$ so that its Laplace operator value ($\Delta I_{(x,y)} = 4I_{(x,y)} - I_{(x-1,y)} - I_{(x+1,y)} - I_{(x,y-1)} - I_{(x,y+1)}$) is consistent with that on $I_{ref}$.

III. 2D strands extraction: compute a 2D orientation field and its corresponding confidence map by using a Gabor kernel function within the hair region obtained in step I, and obtain a set of sparse 2D strand curves by tracing based on the 2D orientation field and the confidence map;

3.1 Orientation Field Estimation

Similar to previous methods, this method uses a series of oriented filter functions $\{K_\theta\}$ to carry out the filter manipulation for the hair region $R_{hair}$ (whose boundary color is the extracted foreground hair color $C_{hair}^{fore}$ during the matting process) obtained from the image preprocessing, where each filter function $K_\theta$ is used to detect a response value of the orientation corresponding to the angle $\theta$. Let $F(x,y,\theta) = (K_\theta * I)_{(x,y)}$ represent the response value of $K_\theta$ at the pixel $(x,y)$. Then the local orientation at the pixel $(x,y)$ is $\tilde{\theta}_{(x,y)} = \arg\max_\theta (F(x,y,\theta))$.

The filter function adopted by this method is composed of 32 even-symmetric Gabor Kernel functions with their orientations evenly spaced between $[0,\pi]$:

$$K_\theta(u,v) = e^{-\frac{1}{2}\left(\frac{\tilde{u}^2}{\sigma_{\tilde{u}}^2} + \frac{\tilde{v}^2}{\sigma_{\tilde{v}}^2}\right)} \cos\left(\frac{2\pi \tilde{u}}{\lambda}\right),$$

$$\tilde{u} = u\cos\theta + v\sin\theta,$$

$$\tilde{v} = -u\sin\theta + v\cos\theta;$$

Ideally, the parameters of the Gabor function should be proportional to the size of visible strand features in the image, the parameters used by this method are $\sigma_u$=1.8, $\sigma_v$=2.4, $\lambda$=4.

Figure 2:
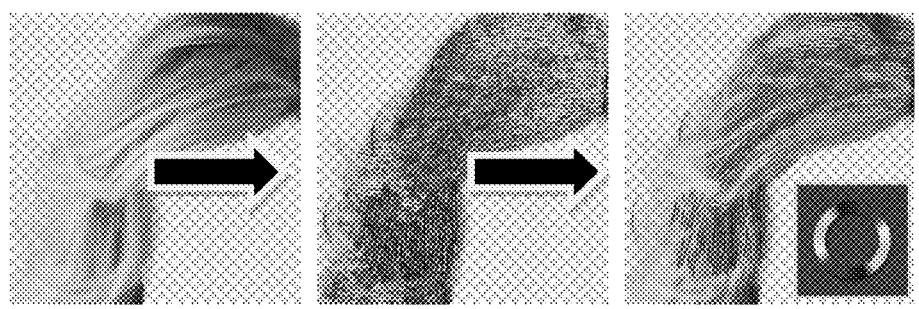
FIG. 2 is a diagram of calculating a 2D sparse orientation field for an image according to the present invention.

In addition to estimating the local orientation field $\tilde{\theta}_{(x,y)}$, this method calculates one confidence $w_{(x,y)}$ at each pixel to represent the accuracy of the orientation field:

$$w_{(x,y)} = \sum_\theta \sqrt{dist(\theta, \tilde{\theta}_{(x,y)}) \cdot (F(x,y,\theta) - F(x,y,\tilde{\theta}_{(x,y)}))^2};$$

Where $dist(\theta_1, \theta_2)$ indicates the angel between orientations. By thresholding the confidence, it is possible to discard unreliable orientation estimations and obtain a sparse but robust orientation field, so as to indicate orientation features of the hair region in the image, as shown in FIG. 2.

Due to the imperfections in input images, sometimes some unreliably estimated orientations may likely have relatively high confidence values. It is hard to distinguish such false positives from true strand features by thresholding. Experiments show that, a correct orientation result with high confidence usually has neighboring pixels with the same high confidence along this direction, while an incorrect orientation result with high confidence is usually isolated. In view of the above, this method adopts an iterative orientation field improving process to enhance the orientation field result and discard the influence of artifacts on the result.

Figure 3:
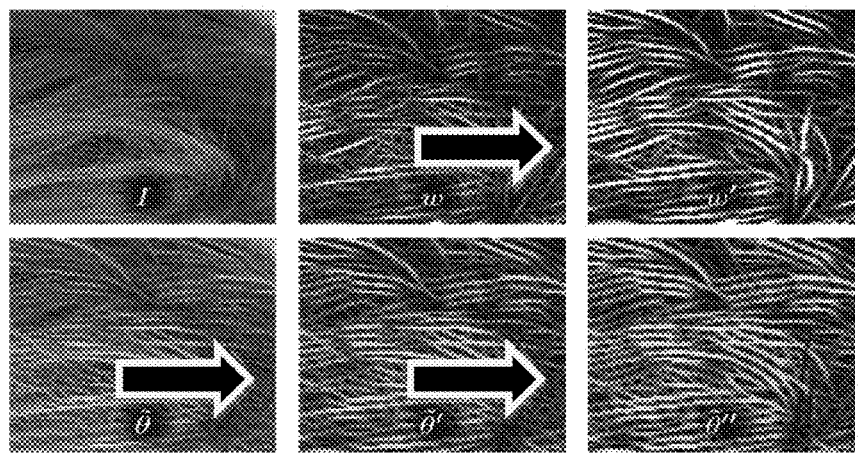
FIG. 3 is a diagram of iteratively refining a 2D sparse orientation field according to the present invention.

After an initial orientation field result $\tilde{\theta}_{(x,y)}$ is obtained, use its corresponding confidence $w_{(x,y)}$ as an input of next iteration, and re-estimate one new orientation field $\tilde{\theta}'_{(x,y)}$ and its corresponding confidence $w'_{(x,y)}$ by using the same method. One to two iterations suffice for a common input image. The process can effectively filter out those high-confidence orientation estimations caused by image artifacts, resulting in a clean and reliable 2D orientation field, as shown in FIG. 3.

3.2 Strand Extraction

Figure 4:
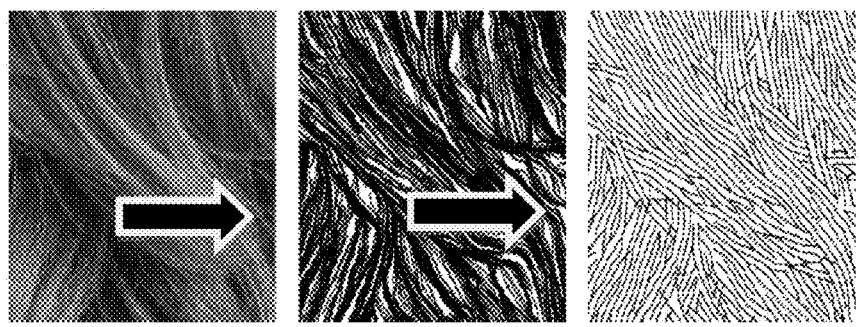
FIG. 4 is a comparison diagram of a sparse 2D strand curve extracted according to the present invention and a dense strand curve.
Figure 5:
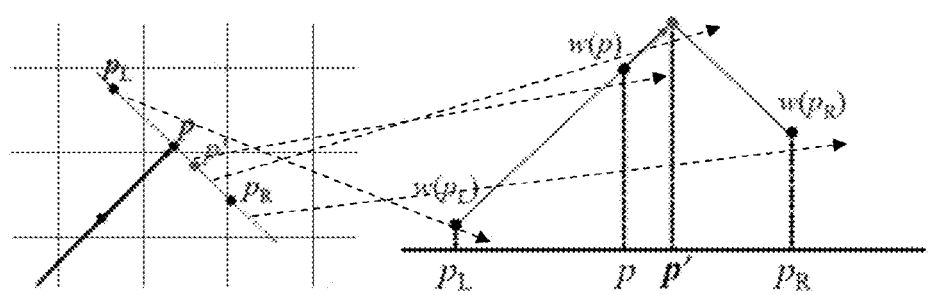
FIG. 5 is a diagram of a re-centering correction to a 2D strand curve location according to the present invention.

As shown in FIG. 4, after the sparse 2D orientation field is obtained from step 3.1, this method converts the orientation field into a set of geometric curves that correspond to individual hair strand structures. Since the input of the method is a single image under uncontrolled environment, recovering accurate 3D curves is almost impractical. Therefore, at this step the method extracts all geometric curves on the 2D image plane, resolves the correct topology for all hair strands intersecting with each other, and stores the local layering relationship to the corresponding curve vertices, as shown in FIG. 5.

Firstly, select a seed pixel within the hair region as a starting point of strand tracing; select the local maximum value point P of confidence on the confidence map as a seed point satisfying:

$$\frac{w_P - \max(w_{P_L}, w_{P_R})}{w_P} > \varepsilon,$$

$$w_P > w_{high};$$

Where $w_{P_L}$ and $w_{P_R}$ are near confidences sampled by the bilinear interpolation method in opposite directions along the line passing P and perpendicular to the local orientation $\tilde{\theta}_P$. Let $w_{high}=0.3$, $w_{low}=0.05$, $\varepsilon=0.2$ with respect to a regular image.

For any selected seed point $P_{seed}$ and its local orientation $\tilde{\theta}_{P_{seed}}$, this method simultaneously carries out strand tracing in both opposite directions. Similar to methods in the prior art, each step of strand tracing extends a curve forward along the direction $V_P$ corresponding to the angle $\tilde{\theta}_P$ at the current location P:

$$P_{i+1}=P_i+\delta v_{P_i};$$

Maintain one tracing status and one health point value for each strand tracing process: an initial health point of the tracing process is 5 when the process starts, and the current strand tracing process ends when the health point drops to 0. If the tracing status of current tracing step is "certain", the tracing direction is determined by the local orientation field and the health point is refilled to 5; if the tracing status is "uncertain", the tracing direction is estimated from the previous traced vertex so that the curvature of the curve is maintained, and the health point value is decreased by 1. At each step i of the tracing process, update the tracing status according to the following rules:

1) if i=0, initially set the tracing status to "certain";
2) if $w_{P_i}<w_{low}$, change the tracing status to "uncertain";
3) if $w_{P_i} \geq w_{low}$ and $\arccos(v_{P_i} \cdot v_{P_{i-1}}) > \theta_{max}$, change the tracing status to "uncertain";
4) if $w_{P_i} \geq w_{low}$ and $\arccos(v_{P_i} \cdot v_{P_{i-1}}) \leq \theta_{max}$, change the tracing status to "certain";
5) keep current tracing status otherwise.

If rule 3) is applicable, this method assumes that the current and all succeeding "uncertain" vertices are occluded by other strands, thus marking them as being occluded.

During the tracing process, simultaneously remove pixels along the strand curves from the list of seed pixels so that all strands will be traced only once, where the tracing step size $\delta$ is set to 75% of the pixel width and $\theta_{max}=\pi/6$. Trim "uncertain" vertices at both ends of each strand after tracing.

Because of possible error accumulation, a strand obtained by tracing in the above steps very likely drifts away from the true center of the curve in the image. This method performs a further re-centering correction after acquiring each traced vertex as follows:

For each 2D curve vertex P, sample in two opposite directions along the line passing P and perpendicular to the local orientation $\tilde{\theta}_P$ to obtain the near confidences $w_{P_L}$ and $w_{P_R}$; fit a tent function $\Lambda(t)$ as follows: letting $\Lambda(0)=w_P$, $\Lambda(-1)=w_{P_L}$, $\Lambda(1)=w_{P_R}$, then calculate argmax($\Lambda(t)$) as an offset correction in the vertical direction.

Sample all 2D strand vertices generated in the step from corresponding locations in the image to obtain their color values.

IV. 3D hairstyle reconstruction: carry out energy optimization in conjunction with the fitted head model according to step II, depth coherence among nearby strands and occlusion correlations among strands, solve and obtain depth information of all 2D strands generated from step III, volumize according to the 3D strands so as to obtain an adequately dense 3D strand set around the head as a recovered hairstyle model, and sample all strand vertices from an original image to obtain hair color values;

4.1 Depth Estimation

Assume depths of the hairstyle near silhouette are all 0 (i.e., depths of the center of the head model); the depth of a strand covering the forehead is the depth of the location corresponding to the head model plus a hair thickness value; further solve depths of other strands between the two in the step, and keep the occlusion relationship obtained from the 2D strand extraction.

Define depth constraints in depth optimization process as follows:

1) depth constraints: constrain known depths on the forehead and the silhouette, etc.; the user may also manually specify the depth of some locations via a stroke-based tool;
2) strand constraints: maintain depth smoothness among nearby vertices along a strand, so as to prevent sharp angles;
3) neighbor constraints: maintain depth coherence among nearby strands with similar orientations.

Let $P_i$ be the position of the ith vertex of a strand, $Z(P_i)$ be the depth value thereof, respectively define energy terms according to the above constraints as:

$$E_Z(P_i) = (Z(P_i) - \bar{Z}(P_i))^2,$$

-continued $$E_S(P_i) = \left(Z(P_i) - \frac{Z(P_{i-1}) + Z(P_{i+1})}{2}\right)^2,$$

$$E_N(P_i) = \left(Z(P_i) - \frac{\sum_{Q \in N(P_i)} Z(Q)^2}{|N(P_i)|}\right);$$

Where $\overline{Z}(P_i)$ is a predefined depth value of $P_i$, $N(P_i)$ contains the neighbor vertices that are not on the same strand of $P_i$ but have a similar orientation and the same occlusion flag.

Finally, solve for depth values of all the strand vertices by minimizing the energy E as follows:

$$E = w_Z E_Z + w_S E_S + w_N E_N;$$

Let $w_Z=5$, $w_S=2$, $w_N=1$. Solve by using the biconjugate gradient method.

4.2 3D Strand Synthesis

Real hair occupies a volumetric region around the head. The 3D hair model generated in step 4.1 so far only include those visible regions from the input image, which roughly cover the outmost layer of the frontal half of the entire hair model. Due to the complex structures and widely different styles of real hairstyle, any assumption about what the invisible part of the hair looks like may not always hold. Therefore, the process aims at defining a hair volumetric region that: 1) compared to the original portrait hairstyle, does not add any hair strands when rendered from the original viewpoint; and 2) transitions smoothly from the frontal (visible) half to the rear (invisible) half.

Firstly, define three depth maps as follows: $D_{front}$, $D_{mid}$, and $D_{back}$. Where the front depth map $D_{front}$ is obtained by rasterizing the computed sparse 3D strands, then depth values at pixels covered by the 3D strands are uniformly diffused to the entire hair region. To calculate the $D_{mid}$, first unite the original hair region with the hair region obtained by projecting the head model as an extended hair region, set depth values near the silhouette of the original hair region as a boundary condition, diffuse the depth values to the entire extended hair region, thus generating the middle depth map $D_{mid}$. The back depth map $D_{back}$ is generated by fixing depth values at the region boundary and pushing depth values of the internal region smoothly backward so that its depths reach outside the head and the entire region fully covers the rear half of the head. The three layered depths partitions the entire hair region into two closed halves, for any 3D point P(x,y,z), if $D_{front}(x,y) < z < D_{middle}(x,y)$, or $D_{middle}(x,y) < z < D_{back}(x,y)$, it is conceived as inside the hairstyle model.

Similarly, propagate 3D orientations, color and opacity values of a strand from the three layers to the interior of the hairstyle model by the method of diffusion. For the 3D orientations, first convert them to structure tensors, and then diffuse them inward. For colors of nonhair regions in $D_{mid}$ and $D_{back}$, conceive the visible part as a source, likewise synthesize the image by using the PatchMatch method. With respect to the application of this method, it is unnecessary to fill all the internal regions, but only those sufficient to form a thick and seamless outer layer.

Unlike related work on hair capture, this method does not force all 3D hair strands to grow from the scalp as this may result in unnecessary discrepancies between the original image and the results re-rendered from the original viewpoint. Therefore, this method traces 3D strands from random locations sampled inside the hair model. During tracing, simultaneously keep a record of strand density within each voxel. Tracing terminates at the voxel whose strand density exceeds a given threshold.

V. Synthesis and application: conveniently carry out portrait editing and manipulations such as portrait pop-ups, hairstyle replacements and hairstyle editing by adopting reconstructed 3D information such as the human hairstyle model, the human head model and so on according to the aforementioned steps I to IV.

5.1 Portrait Pop-Ups

Figure 6:
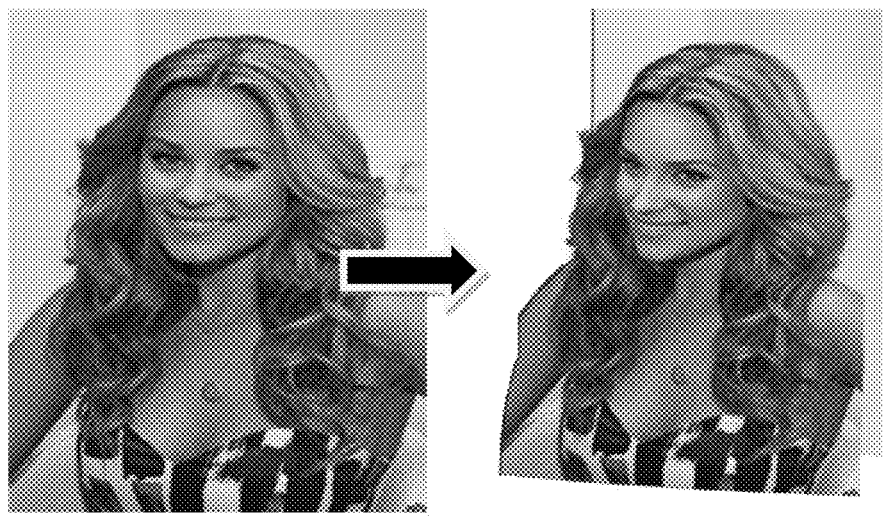
FIG. 6 is a rendered image of portrait pop-ups according to the present invention.

As shown in FIG. 6, recovering a subject from a single image is of great interest in interactive applications. However, due to the complexity of human hairstyle, the existing work focuses only on the facial region or adds some ad-hoc hair to the fitted head model. Nevertheless, by using the strand-based hair model in light of this method, it is possible to generate more vivid head avatars.

5.2 Hairstyle Replacement

Figure 7:
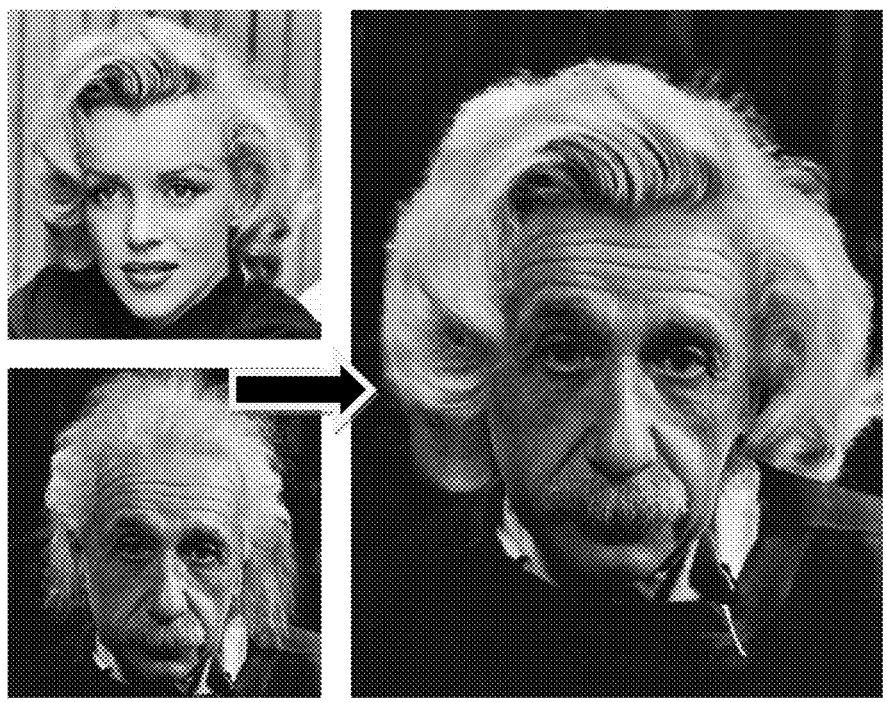
FIG. 7 is a rendered image of hairstyle replacement according to the present invention.

As shown in FIG. 7, replacing an individual's hairstyle in a portrait allows the user to try on different hairstyles and to view possible actual effects. Give a source portrait image $I_{src}$ and a target portrait image $I_{dst}$, where the goal of this application is to replace the hairstyle in the target portrait image $I_{dst}$ by the hairstyle in the source portrait image $I_{src}$. First extract the hairstyle model and the head model from $I_{src}$, and create a portrait pop-up model for $I_{dst}$. By making use of the one to one vertex correspondence between the source portrait head model and the target portrait head model, calculate a transformation $M_T$ of the heads from $I_{src}$ to $I_{dst}$ so as to compensate for changes in shapes and positions of the two. $M_T$ includes two parts: a translation and rotation parameter computed during the head model fitting process, and a scaling parameter that aligns bounding boxes of the two head models. Then transform the hairstyle model extracted from $I_{src}$ to a proper position in $I_{dst}$ via $M_T$.

To increase realism of the results, calculate a mutual ambient occlusion term for the transferred hair model and the target subject. To avoid darkening effects on the subject, this method excludes self occlusion and only considers mutual occlusion between the hair and the subject.

5.3 Hairstyle Editing

By utilizing the 3D hair model, it is possible to implement numerous tools that allow the user to edit a portrait hairstyle, such as adjusting color, smoothness, shininess, or adding geometric noises. The user may adjust hairstyle color or add color details on strand scales, where the smoothness modification is to simply filter the color along strand vertices. When editing hairstyle highlights, initially assume a single point light (simulating a camera-mounted flashlight) located at the camera and allow the user to modify its properties in real time. This method adopts the Marschner model (Marschner, S., Jensen, H. W., Cammarano, M., Worley, S., and Hanrahan, P. 2003. Light scattering from human hair fibers. ACM Trans. Graph. 22, 3, 780-791.) to add a highlight effect to the hairstyle.

What is claimed is:

1. A method for single-view hair modeling and portrait editing, comprising the steps:

(1) image preprocessing: segmenting, by a processor, an image into four layers based upon sparse user strokes by adopting a Lazy-Snapping image segmentation method: human hair, human face, human body and background, calculating, by the processor, opacity values in a segmented human hair region by an alpha-matting method, setting, by the processor, apart the foreground color of the segmented human hair region from its background color, and completing, by the processor, occluded portions in the human body region and the background region;

(2) 3D head model reconstruction: automatically locating, by the processor, facial feature points by an active shape model (ASM) method, estimating, by the processor, head transformation parameters and fitting a 3D model by least squares optimization based on the feature points and a 3D head model database after principle component analysis (PCA) dimension reduction, and carrying, by the processor, out inverse texture mapping in accordance with the segmented human face region obtained by step (1), so as to obtain a texture image of a head model;

(3) 2D strands extraction: computing, by the processor, a 2D orientation field and its corresponding confidence map by using a Gabor kernel function within the hair region obtained in step (1), and obtaining, by the processor, a set of sparse 2D strand curves by tracing based on the 2D orientation field and the confidence map;

(4) 3D hairstyle reconstruction: carrying, by the processor, out energy optimization in conjunction with the fitted head model according to step (2), depth coherence among nearby strands and occlusion correlations among strands, solving and obtaining, by the processor, depth information of all 2D strand generated from step (3), volumizing, by the processor and according to the 3D strands so as to obtain an adequately dense 3D strand set around the head as a recovered hairstyle model, and sampling, by the processor, all strand vertices from an original image to obtain hair color values;

(5) synthesis and application: carrying, by the processor, out portrait editing and manipulations including portrait pop-ups, hairstyle replacements and hairstyle editing by adopting reconstructed 3D information including the human hairstyle model and the human head model according to the aforementioned steps (1)-(4).

2. The method for single-view hair modeling and portrait editing according to claim 1, wherein step (1) comprises following sub-steps:

(1.1) user-assisted image segmentation: segmenting, by the processor, visible regions of each layer by adopting the Lazy-Snapping technique wherein a user assists in indicating a few strokes, and obtaining, by the processor, four layers being respectively a human hair region $R_{hair}$, region $R_{face}$, a human body region $R_{body}$ and a background region $R_{background}$;

(1.2) matting of the hair region: automatically improving, by the processor, a hair segmentation result with following matting manipulations:

(1.2.1) eroding and dilating, by the processor, the hair region $R_{hair}$ to a width of ten pixels, and obtaining two new hair regions, $R_{hair}^{erosion}$ and $R_{hair}^{dilation}$;

(1.2.2) treating, by the processor, the hair regions obtained from step (1.2.1), $R_{hair}$, $R_{hair}^{erosion}$ and $R_{hair}^{dilation}$ as a group of trimap, letting, by the processor, hair opacity of an outer region of the dilated $R_{hair}^{dilation}$ be zero, letting, by the processor, hair opacity of an inner region of the eroded $R_{hair}^{erosion}$ be one, and solving, by the processor, hair opacity of a region inside $R_{hair}^{dilation}$ and outside $R_{hair}^{erosion}$, which is a hair boundary region, by a matting method, and then obtaining, by the processor, hair opacity values $A_{hair}$ in the entire image, a foreground color $C_{hair}^{foreground}$ and a background color $C_{hair}^{background}$ in the hair boundary region, which satisfies:

$$A_{hair}C_{hair}^{foreground}+(1-A_{hair})C_{hair}^{background}=C_{image};$$

in the formula, $C_{image}$ is a hair region with opacities;

(1.2.3) treating, by the processor, a hair region with opacities obtained from step (1.2.2) as an improved hair segmentation result, and within the hair boundary region (the region inside $R_{hair}^{dilation}$ and outside $R_{hair}^{erosion}$), treating, by the processor, the foreground color $C_{hair}^{foreground}$ as a hair region color and treating the background color $C_{hair}^{background}$ as a hair background region color;

(1.3) Completing body and background regions: filling, by the processor, the occluded portions by adopting a PatchMatch method, and interactively indicating, by the processor, a body boundary on the occluded locations.

3. The method for single-view hair modeling and portrait editing according to claim 1, wherein step (2) is carried out by following sub-steps:

(2.1) localization of image facial feature points: firstly, carrying, by the processor, out a facial recognition by adopting a Viola-Jones recognition algorithm, and approximately estimating, by the processor, a size of the human face region;

(2.2) head model fitting: utilizing, by the processor, a Basel Face Model database as a head model database, wherein coherence of all models thereof on topology structures and model scales are normalized; concatenating, by the processor, all vertices' 3D coordinates of each head model in the database into one vector, $S=[P_x^1, P_y^1, P_z^1, \ldots, P_x^v, P_y^v, P_z^v]$, as one training data sample; carrying, by the processor, out a principle component analysis (PCA) analysis for all data, and obtaining an average data vector $\overline{S}$, first $n_p$ pivot vectors and corresponding feature values $\lambda$; given any coefficient vector $\beta$ of the pivot vector, generating, by the processor, a corresponding head model data vector:

$$S^* = \overline{S} + V \cdot \beta;$$

assuming, by the processor, a portrait is a weak perspective projection model, with respect to a projection matrix R, a manipulation of projecting a 3D point $P_{3D}$ onto a 2D image plane is $P_{2D}=R \cdot P_{3D}$; during a process of head model fitting, defining, by the processor, an energy equation E comprising a feature point error $E_{error}$ and a parameter penalty $E_{coef}$ as follows:

$$E = w_{error}E_{error} + w_{coef}E_{coef},$$

$$E_{error} = \sum_{k=0}^{n_f} w_k \| R \cdot (\overline{S}_{(k)} + V_{(k)} \cdot \beta) - X_k \|^2,$$

$$E_{coef} = \sum_{k=0}^{n_p} \left(\frac{\beta_k}{\lambda_k}\right)^2;$$

wherein $w_k$ is a weight of a corresponding feature point, $X_k$ is a localized position of the feature point, and $\overline{S}_{(k)}$ and $V_{(k)}$ are corresponding values of the feature point in the head model on an average model and on a feature vector respectively; with respect to a nonsilhouette feature point, statically selecting a certain vertex in the head model as its corresponding point:

$$V_{(k)} = V_{index(k)},$$

however, with respect to a face outline, dynamically selecting, by the processor, a vertex in the current head model which is closest to the feature point as a corresponding model position of the feature point;

optimizing, by the processor, an energy term by the method of least squares, obtaining a feature vector coefficient $\beta$ when $\nabla_\beta E=0$, and obtaining its corresponding head model, which is a fitted result $S_{fit}$;

during a fitting process, according to the current fitted result $S_{fit}$, iteratively estimating, by the processor, a projection matrix R by least squares optimization, and fitting a head model $S_{fit}$ under the current projection matrix R;

(2.3) model texture reconstruction: by adopting a texture parametric UV coordinate of the head model, anti-aliasing texture mapping, by the processor, the segmented human face region $R_{face}$ in step (1) onto the fitted head model $S_{fit}$ in step (2.2), and generating, by the processor, a texture image $I_{fit}$ of a visible part; carrying, by the processor, out a filling manipulation for an invisible part (which is a region that has not been anti-aliasing texture mapped) on $I_{fit}$; referring to a standard human face texture image $I_{ref}$ in the Basel Face Model database, solving, by the processor, all invisible pixels on $I_{fit}$ so that its Laplace operator value $(\Delta I_{(x,y)}=4I_{(x,y)}-I_{(x-1,y)}-I_{(x+1,y)}-I_{(x,y-1)}-I_{(x,y+1)})$ is consistent with that on $I_{ref}$.

4. The method for single-view hair modeling and portrait editing according to claim 1, wherein step (3) is carried out by following sub-steps:

(3.1) orientation field estimation: using, by the processor, oriented filter functions $\{K_\theta\}$ to carry out a filter manipulation for a hair region $R_{hair}$ (whose boundary color is an extracted foreground hair color $C_{hair}^{fore}$ during a matting process) obtained from the image preprocessing, wherein each filter function $K_\theta$ is used to detect a response value of an orientation corresponding to an angle $\theta$; letting $F(x,y,\theta)=(K_\theta*I)_{(x,y)}$ represent a response of $K_\theta$ at a pixel (x,y); a local orientation at the pixel (x,y) is $\tilde{\theta}_{(x,y)}=\mathrm{argmax}_\theta(F(x,y,\theta))$; the filter function adopted by this step is composed of 32 even-symmetric Gabor Kernel functions with their orientations evenly spaced between $[0, \pi]$:

$$K_\theta(u,v) = e^{-\frac{1}{2}\left(\frac{\tilde{u}^2}{\sigma_{\tilde{u}}^2}+\frac{\tilde{v}^2}{\sigma_{\tilde{v}}^2}\right)}\cos\left(\frac{2\pi\tilde{u}}{\lambda}\right),$$

$\tilde{u} = u\cos\theta + v\sin\theta,$ $\tilde{v} = -u\sin\theta + v\cos\theta;$ ideally, the parameters of the Gabor Kernel function should be proportional to the size Of visible strand features in the image, the parameters used are $\sigma_u=1.8, \sigma_v=2.4, \lambda=4$;

in addition to estimating a local orientation field $\tilde{\theta}_{(x,y)}$, calculating, by the processor, one confidence $w_{(x,y)}$ at each pixel to represent an accuracy of the orientation field:

$$w_{(x,y)} = \sum_\theta \sqrt{dist(\theta,\tilde{\theta}_{(x,y)})\cdot(F(x,y,\theta)-F(x,y,\tilde{\theta}_{(x,y)}))^2};$$

wherein dist $(\theta_1, \theta_2)$ indicates an angel between orientations;

after an initial orientation field result $\tilde{\theta}_{(x,y)}$ is obtained, using, by the processor, its Corresponding confidence $w_{(x,y)}$ as an input of next iteration, and re-estimating one new orientation field $\tilde{\theta}'_{(x,y)}$ and its corresponding confidence $w'_{(x,y)}$ by using the same method; one to two iterations suffice for a common input image; this process can effectively filter out those high-confidence orientation estimations caused by image artifacts, resulting in a clean and reliable 2D orientation field;

(3.2) strand extraction: converting, by the processor, the sparse 2D orientation field obtained from step (3.1) into a set of geometric curves that correspond to individual hair strand structures: firstly, selecting, by the processor, a seed pixel within the hair region as a starting point of strand tracing; selecting, by the processor, a local maximum value point P of confidence on the confidence map as a seed point satisfying:

$$\frac{w_P - \max(w_{P_L}, w_{P_R})}{w_P} > \varepsilon,$$

$w_P > w_{high};$ wherein $w_{P_L}$ and $w_{P_R}$ are near confidences sampled by the bilinear interpolation method in opposite directions along a line passing P and perpendicular to the local orientation $\tilde{\theta}_P$; letting $w_{high}=0.3, w_{low}=0.05, \epsilon 0.2$;

for any selected seed point $P_{seed}$ and its local orientation $\tilde{\theta}_{P_{seed}}$, simultaneously carrying, by the processor, out strand tracing in both opposite directions; extending, by the processor, a curve forward along a direction $V_P$ corresponding to an angle $\tilde{\theta}_P$ at the current location P by each step of strand tracing:

$P_{i+1}=P_i+\delta v_{P_i};$ maintaining, by the processor, one tracing status and one health point value for each strand tracing process: an initial health point of a tracing process being 5 when the process starts, and the current strand tracing process ending when the health point drops to 0; if the tracing status of current tracing step is "certain", determining, by the processor, a tracing direction by the local orientation field, refilling the health point to 5; if the tracing status is "uncertain", estimating, by the processor, the tracing direction from a previous traced vertex so that a curvature of the curve is maintained, decreasing the health point value by 1; at each step i of the tracing process, updating, by the processor, the tracing status according to following rules:

a) if i=0, initially setting the tracing status to "certain";
b) if $w_{P_i}<w_{low}$, changing the tracing status to "uncertain";
c) if $w_{P_i}\geq w_{low}$ and $\arccos(v_{P_i}\cdot v_{P_{i-1}})>\theta_{max}$, changing the tracing status to "uncertain";
d) if $w_{P_i}\geq w_{low}$ and $\arccos(v_{P_i}\cdot v_{P_{i-1}})\leq\theta_{max}$, changing the tracing status to "certain";
e) keeping current tracing status otherwise;

if rule c) is applicable, assuming, by the processor, that the current and all succeeding "uncertain" vertices are occluded by other strands, thus marking them as being occluded;

during the tracing process, simultaneously removing, by the processor, pixels along the strand curves from a list of seed pixels so that all strands will be traced only once, wherein a tracing step size $\delta$ is set to 75% of a pixel width and $\theta_{max}\pi/6$; trimming "uncertain" vertices at both ends of each strand after tracing;

because of possible error accumulation, a strand obtained by tracing in the above steps very likely drifts away from a true center of a curve in the image; performing a further re-centering correction after acquiring each traced vertex as follows:

for each 2D curve vertex P, sampling, by the processor, in two opposite directions along the line passing P and perpendicular to the local orientation $\tilde{\theta}_P$ to obtain the near confidences $w_{P_L}$ and $w_{P_R}$; fitting a tent function $\Lambda(t)$ as follows: letting $\Lambda(0)=w_P$, $\Lambda(-1)=w_{P_L}$, $\Lambda(1)=w_{P_R}$, then calculating $\mathrm{argmax}(\Lambda(t))$ as an offset correction in the vertical direction; and sampling, by the processor, all 2D strand vertices generated in the step from corresponding locations in the image to obtain their color values.

5. The method for single-view hair modeling and portrait editing according to claim 1, wherein step (4) is carried out by following sub-steps:

(4.1) depth estimation: assuming, by the processor, depths of the hairstyle near silhouette are all 0 (which is depths of the center of the head model); a depth of a strand covering the forehead being a depth of a location corresponding to the head model plus a hair thickness value; further solving, by the processor, depths of other strands between the two in this step, and keeping an occlusion relationship obtained from a 2D strand;

defining, by the processor, depth constraints in depth optimization process as follows:

a) depth constraints: constraining known depths on the forehead and the silhouette; manually specifying, by a user, a depth of some locations via a stroke-based tool;

b) strand constraints: maintaining depth smoothness among nearby vertices along a strand, so as to prevent sharp angles;

c) neighbor constraints: maintaining depth coherence among nearby strands with similar orientations;

letting $P_i$ be a position of an ith vertex of a strand, $Z(P_i)$ be a depth value thereof, respectively defining energy terms according to the above constraints as:

$$E_Z(P_i) = (Z(P_i) - \overline{Z}(P_i))^2,$$

$$E_S(P_i) = \left(Z(P_i) - \frac{Z(P_{i-1}) + Z(P_{i+1})}{2}\right)^2,$$

$$E_N(P_i) = \left(Z(P_i) - \frac{\sum_{Q \in N(P_i)} Z(Q)^2}{|N(P_i)|}\right);$$

wherein $\overline{Z}(P_i)$ is a predefined depth value of $P_i$, $N(P_i)$ contains the neighbor vertices that are not on the same strand of $P_i$ but have a similar orientation and the same occlusion flag;

finally, solving, by the processor, for depth values of all the strand vertices by minimizing an energy E as follows:

$$E = w_Z E_Z + w_S E_S + w_N E_N;$$

letting $w_Z=5$, $w_S=2$, $w_N=1$; solving by using a biconjugate gradient method; and (4.2) 3D strand synthesis: firstly, defining, by the processor, three depth maps as follows: $D_{front}$, $D_{mid}$, and $D_{back}$; wherein the front depth map $D_{front}$ is obtained by rasterizing the computed sparse 3D strands, then uniformly diffusing depth values at pixels covered by the 3D strands to the entire hair region; in order to calculate the $D_{mid}$, first uniting, by the processor, an original hair region with a hair region obtained by projecting the head model as an extended hair region, setting depth values near the silhouette of the original hair region as a boundary condition, diffusing the depth values to the entire extended hair region, thus generating the middle depth map $D_{mid}$; generating, by the processor, the back depth map $D_{back}$ by fixing depth values at a region boundary and pushing depth values of an internal region smoothly backward so that its depths reach outside the head and the entire region fully covers a rear half of the head; partitioning, by the three layered depths, the entire hair region into two closed halves for any 3D point $P(x,y,z)$, if $D_{front}(x,y)<z<D_{middle}(x,y)$, or $D_{middle}(x,y)<z<D_{back}(x,y)$, conceiving it as inside the hairstyle model; similarly, propagating 3D orientations, colors and opacity values of a strand from the three layers to interior of the hairstyle model by a method of diffusion; for the 3D orientations, first converting, by the processor, them to structure tensors, then diffusing them inward; for colors of nonhair regions in $D_{mid}$ and $D_{back}$, conceiving, by the processor, the visible part as a source, likewise synthesizing an image by using a PatchMatch method.

6. The method for single-view hair modeling and portrait editing according to claim 1, wherein in step (5), the hairstyle replacements specifically are: replacing, by the processor, an individual's hairstyle in a portrait, allowing the user to try on different hairstyles and to view possible actual effects; giving, by the processor, a source portrait image $I_{src}$ and a target portrait image $I_{dst}$, wherein a goal of this application is to replace a hairstyle in the target portrait image $I_{dst}$ by a hairstyle in the source portrait image $I_{src}$; first extracting, by the processor, the hairstyle model and the head model from $I_{src}$, and creating a portrait pop-up model for $I_{dst}$; by making use of the one to one vertex correspondence between the source portrait head model and the target portrait head model, calculating, by the processor, a transformation $M_T$ of the heads from $I_{src}$ to $I_{dst}$ so as to compensate for changes in shapes and positions of the two; $M_T$ comprises two parts: a translation and rotation parameter computed during head model fitting process, and a scaling parameter that aligns bounding boxes of the two head models; then transforming, by the processor, the hairstyle model extracted from $I_{src}$ to a proper position in $I_{dst}$ via $M_T$; and the hairstyle editing specifically is: adjusting, by the processor, hairstyle color or adding color details on strand scales by the user, wherein smoothness modification is to simply filter the color along strand vertices; and adopting, by the processor, a Marschner model to add a highlight effect to the hairstyle.

* * * * *